(12) United States Patent
Strohmeier

(10) Patent No.: US 6,871,060 B1
(45) Date of Patent: Mar. 22, 2005

(54) CAR RADIO INCLUDING A HAND DEVICE

(75) Inventor: Wolfgang Strohmeier, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/508,019

(22) PCT Filed: Mar. 13, 1998

(86) PCT No.: PCT/DE98/00740

§ 371 (c)(1),
(2), (4) Date: Mar. 6, 2000

(87) PCT Pub. No.: WO99/16180

PCT Pub. Date: Apr. 1, 1999

(30) Foreign Application Priority Data

Sep. 23, 1997 (DE) .......................................... 197 41 854

(51) Int. Cl.[7] .............................. H04B 1/06; H04M 1/00
(52) U.S. Cl. ................. 455/345; 455/556.1; 455/575.9; 455/557; 455/66.1
(58) Field of Search ................................ 455/566, 66.1, 455/344–347, 348, 349, 556.1, 557, 74; 345/168–169; 381/86

(56) References Cited

U.S. PATENT DOCUMENTS

| | | | | |
|---|---|---|---|---|
| 4,737,656 A | * | 4/1988 | Gottlieb | 307/10.1 |
| 5,537,673 A | | 7/1996 | Nagashima et al. | |
| 5,910,882 A | * | 6/1999 | Burrell | 361/681 |
| 5,926,119 A | * | 7/1999 | Lindeman et al. | 341/22 |
| 5,974,333 A | * | 10/1999 | Chen | 455/569.2 |
| 6,160,997 A | * | 12/2000 | Oberlaender | 455/66 |

FOREIGN PATENT DOCUMENTS

| | | |
|---|---|---|
| DE | 91 09 141 | 1/1992 |
| EP | 0 472 361 | 2/1992 |

* cited by examiner

*Primary Examiner*—Erika A. Gary
(74) *Attorney, Agent, or Firm*—Kenyon & Kenyon

(57) ABSTRACT

In a car radio having a handset that is inserted into a horizontally positioned holder in a front panel and has a screen as well as labeled control keys and can be used as the control unit for a car radio or as a telephone, the use of the handset is made easier in both operating positions by orienting the labeling of the control keys along an axis that is rotated out of the usual perpendicular alignment of the handset in the mounted position by an angle between 30 and 60 degrees in the direction of the longitudinal axis of the handset, thereby making the labeling easy to read in both operating positions of the handset.

8 Claims, 4 Drawing Sheets

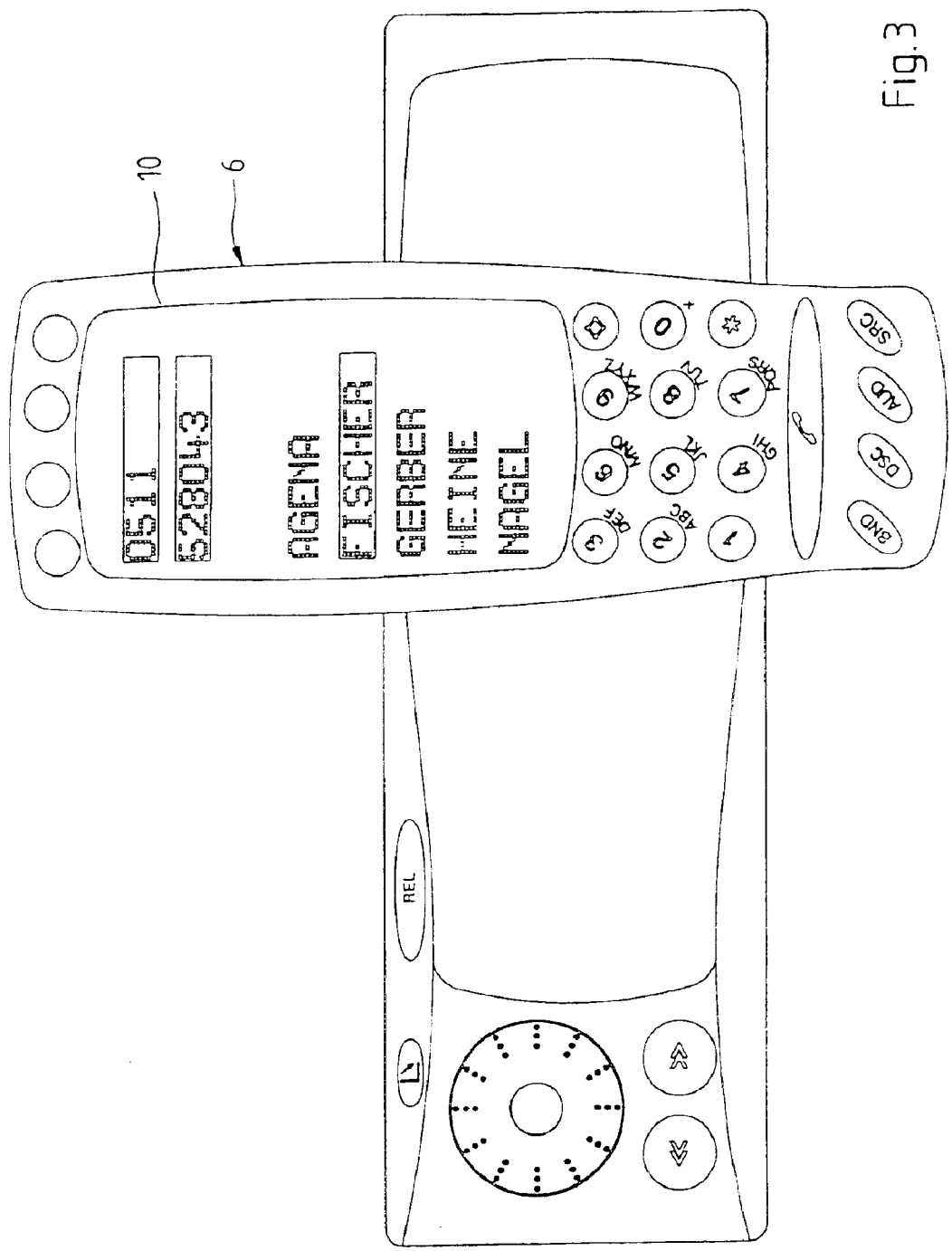

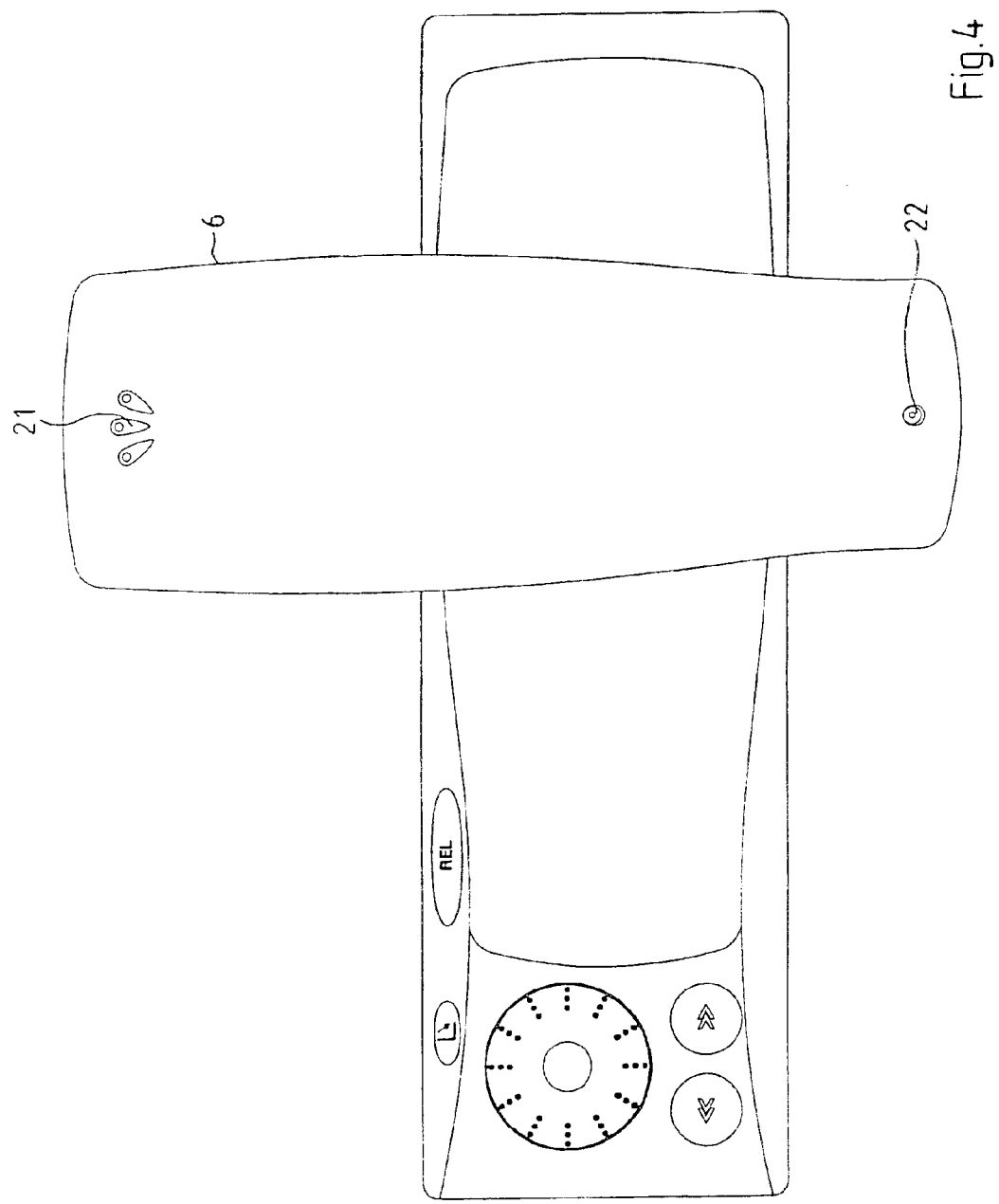

CAR RADIO INCLUDING A HAND DEVICE

BACKGROUND INFORMATION

The present invention relates to a car radio having a handset that is inserted into a horizontally positioned holder in a front panel and has a display as well as labeled control keys and can be used as the control unit for the car radio or as a telephone.

A car radio having a removable control unit that is simultaneously designed as a telephone handset is known from German Patent No. 91 09 141. Because the main reason for control unit removability was to protect against theft, the design of the removable control part as a telephone was intended as an additional benefit. In this arrangement, the control and display elements can be used for both purposes. The known concept has not been generally accepted because easier-to-use electronic anti-theft system means have been introduced in the meantime. In addition, handling of the removable control part as a telephone is different from the handling of commonly known telephone sets. According to the current art, a physical connection is therefore no longer established between the car radio and telephone, with the telephone instead being mounted as a separate unit in a suitable location in the automobile. However, this gives rise to the problem that mounting the telephone handset in a holder, which also serves to charge the telephone handset, frequently means making compromises between functionality and design.

SUMMARY OF THE INVENTION

To resolve this problem, the physical connection between the car radio and telephone handset is established according to the present invention, and to avoid the resulting handling disadvantages, the labeling of the control keys is oriented according to the present invention on an axis that is rotated out of the usual vertical direction of the handset in its mounted position by an angle between 30 and 60 degrees in the direction of the handset's longitudinal axis, thereby making it easy to read the labeling when the handset is in either operating position.

An object achieved according to the present invention enables the handset to be used comfortably both in the mounted position and in the hand-held operating position, which is largely rotated 90 degrees and in which the longitudinal axis runs in a largely vertical direction. Both operating positions are therefore rotated approximately 90 degrees in relation to one another. The labeling is arranged according to the present invention so that the labeling axis for the control keys is located between the two operating positions in an area surrounding the central point between the two operating positions, preferably exactly in the center. This enables the labeling to be read comfortably in either operating position, with the slightly rotated labeling orientation in the two operating positions being perceived merely as a design variant. The same applies to elongated keys, which are provided to distinguish them from the functions of round keys, and are oriented perpendicular to the axis of the labeling.

In one especially preferred embodiment of the present invention, the direction of the display on the screen can also be shifted to adjust it to the operating position. For this purpose, the handset can be provided with a position sensor that detects the respective operating position and automatically shifts the display. Of course, manual shifting is also possible and suitable.

The handset according to the present invention is naturally also suitable for operating the car radio by remote control, provided it is equipped with a remote control transmitter.

BRIEF DESCRIPTION OF THE DRAWINGS

FIG. 3 shows the arrangement according to FIG. 1, with the handset removed in the usual operating position for making telephone calls and with a shifted display for this purpose.

FIG. 4 shows the arrangement according to FIG. 3, with the handset viewed from the rear.

DETAILED DESCRIPTION

Figure 1:
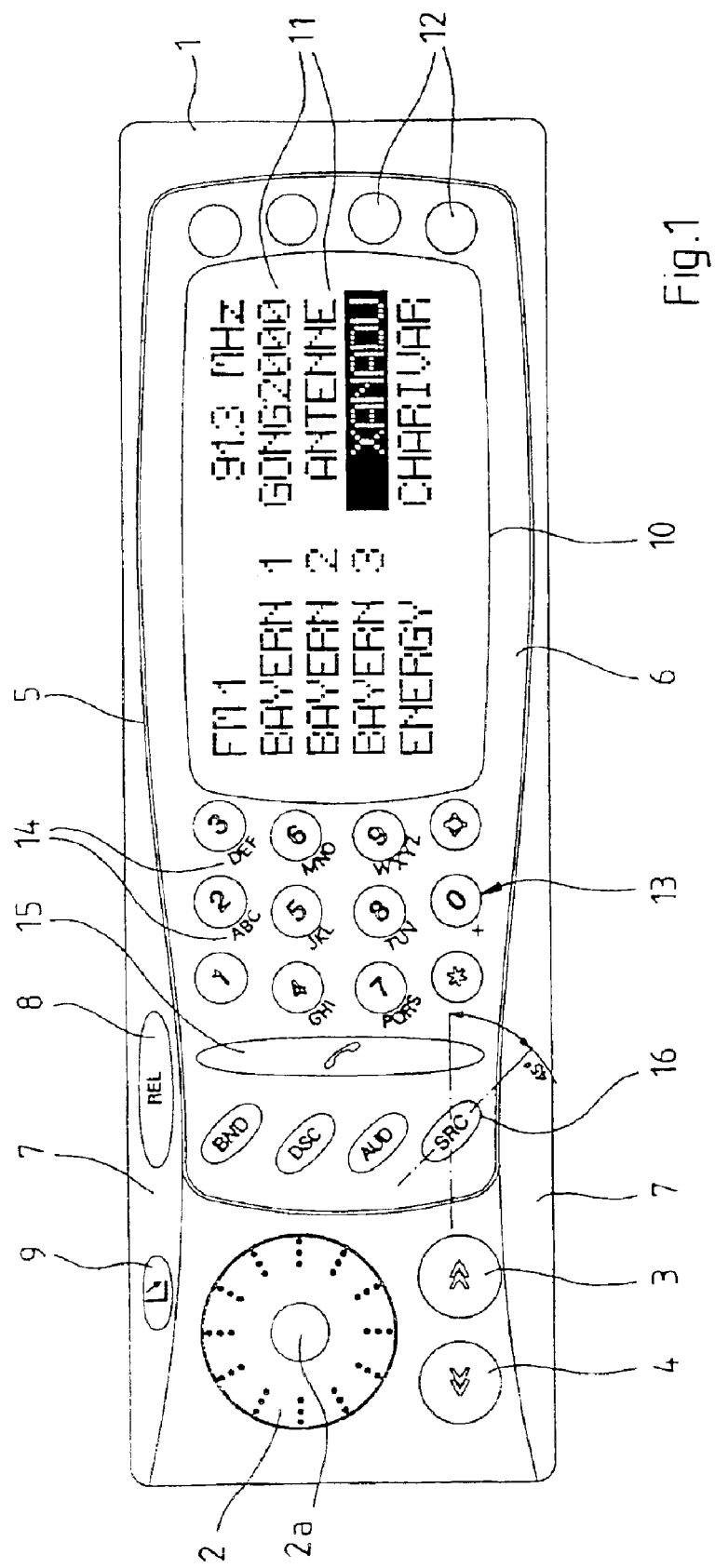
FIG. 1 shows a front panel of a car radio having an inserted handset in car radio mode.

FIG. 1 shows a front panel 1 of a car radio, which is designed in the usual manner according to standard dimensions with a width that is greater than its height. On one side of front panel 1 is an adjusting dial 2, which can be used, among other things, to adjust the car radio volume. Beneath it is a forward search key 3 and a backward search key 4, which can be used to perform a radio station search, tape fast-forward function or a skip function of a CD drive, depending on the activated audio source.

A recess 5, into which a cordless, removable handset 6 is inserted, occupies most of the width of front panel 1. Handset 6 and recess 5 have a contour that bulges outward slightly and is slightly indented on both sides in the area extending toward volume control dial 2. In the indentation area, the top and bottom portions of front panel 1 are provided with a beveled surface 7. In the upper beveled area is an elongated key 8 for unlocking handset 6 and a smaller key 9, which can be used to move entire front plate 1 downward in a motorized manner, revealing a bay for a magnetic tape deck and/or a CD player.

The handset has a screen 10 on which alphanumeric displays can appear on horizontal lines 11, as shown in FIG. 1. Adjusting dial 2 can be used to control cursor or scrolling actions on screen 10. A central key 2a serves both as an ENTER key and as an OFF key (controlled by time windows).

On one side of the screen are four keys 12, which are not labeled and are used as soft keys to select, for example, stored radio stations that are displayed on four lines near keys 12 onscreen 10.

On the other side of screen 10 is a numeric keypad 13 of the usual type, which includes round keys that are labeled with numbers from "1" to "0". Next to the keys on numeric keypad 13 are alphabetical key labels 14 which represent the letters that can be selected with the corresponding key.

Alphanumeric keypad 13 is delimited at one end by a connect/activate key 15, which extends along the entire height of numeric keypad 13 and serves in the usual manner to set up and cut off phone calls, respectively.

On the side of connect/activate key 15 opposite numeric keypad 13 is a row of four adjacent elongated keys 16, which are used to influence the active mode of operation, with a BND key serving to select bands during radio operation, a DSC key to select individual basic settings, and an AUD key to select functions that influence the sound. A fourth key, SRC, is used to switch handset 6 between car radio mode, CD or tape mode, and telephone mode.

Keys 16 are elongated, oval-shaped keys and are thus distinguishable from the round keys on numeric keypad 13, which enables them to identify a different type of function. The four keys on numeric keypad 13 located directly next to screen 10 have the same function as keys 12 when handset 6 is operating in radio mode, and thus function as soft keys for making selections in conjunction with a corresponding display on screen 10.

FIG. 1 shows handset 6 in car radio mode, in which station names of stored functions, for example, are displayed on screen 10.

Figure 2:
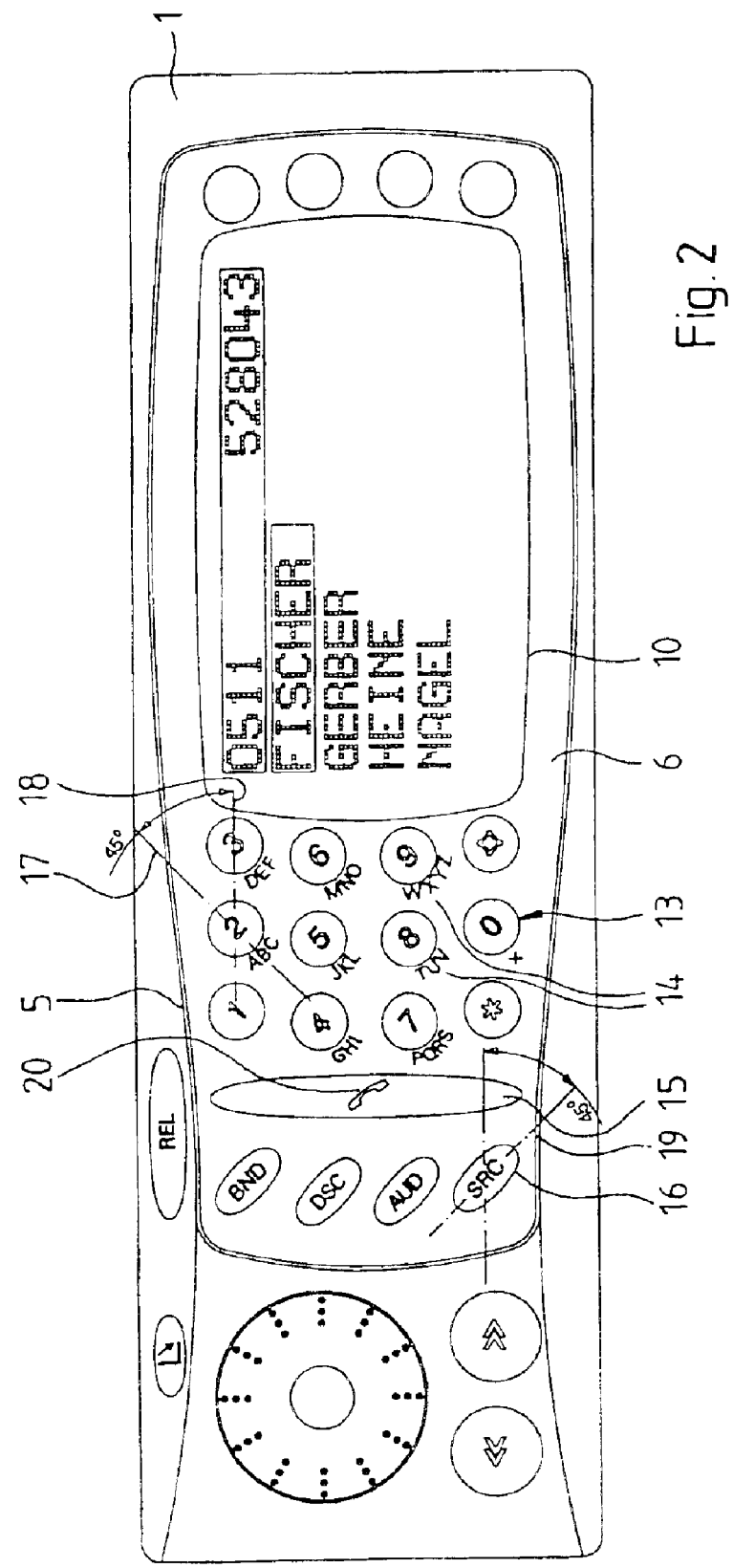
FIG. 2 shows the arrangement according to FIG. 1 in a telephone mode.

After switching to telephone mode, which is illustrated in FIG. 2, screen 10 displays, for example, stored telephone numbers i.e., corresponding names.

FIG. 3 illustrates the operation of handset 6 in telephone mode after handset 6 has been removed from recess 5 in front panel 1. Because the removed handset is usually operated in a position in which the longitudinal axis of handset 6 is oriented more or less vertically—as shown in FIG. 3—screen 10 is shifted so that the items displayed on screen 10 in telephone mode now appear on lines that are perpendicular to the longitudinal axis.

FIGS. 2 and 3 show that the key labeling on numeric keypad 13, including printed letters 14, connection control key 15, and elongated keys 16, are oriented in the direction of a central axis 17, which is rotated around an 45-degree angle, for example, in relation to longitudinal axis direction 18 of handset 6. Printed letters 14 are also arranged largely symmetrically in relation to labeling axis 17 on a circle segment. Longitudinal axis 19 of elongated keys 16 is also perpendicular to the direction of labeling axis 17, so that the labeling can extend across the greater width of longitudinal axis 16 and still be positioned symmetrically in relation to labeling axis direction 17. A telephone handset symbol 20, which is usually provided on connection control key 15, is also oriented symmetrically in relation to labeling axis direction 17.

As a result of this labeling design, the labels are always rotated no more than 45 degrees out of the vertical in the operating position of handset 6 illustrated in both FIG. 2 and FIG. 3 when labeling axis 17 forms a 45-degree angle with longitudinal axis 18.

In one embodiment, it can be useful to provide a slightly larger angle between axes 17, 18 illustrated in FIG. 2—up to 60 degrees, for example—thus making it easier to read the labels when handset 6 is in its horizontal mounted position. This accounts for the fact that removed and hand-held handset 6 is not always carried in a completely vertical position during operation, but rather a certain inclined position, in which the handset is instinctively placed by the user, can be tolerated to improve readability.

FIG. 4 shows the design of the back of handset 6, which has multiple elongated audio openings 21 for a speaker and one smaller audio opening 22 at the opposite end of handset 6 for a speaker microphone.

The representations illustrated in the drawings show that, despite the dual function of handset 6, the telephone's ease of use and legibility in both operating positions (FIGS. 1 and 2, respectively, and FIG. 3) are on a par with those of a normal telephone handset. In addition, handset 6 according to the present invention offers an attractive design in both operating positions.

What is claimed is:

1. A car radio, comprising:
   a front panel unit including a horizontally positioned holder, the front panel unit including a radio circuit for receiving a broadcast radio program;
   a detachable handset capable of functioning as one of a control unit for a car radio and a telephone, the handset being inserted into the horizontally positioned holder in the front panel unit of the car radio and providing a control signal to the radio circuit;
   a screen; and
   control keys provided with a labeling oriented along a first axis that is rotated out of a usual vertical alignment of the handset in a mounted position by an angle between 30 and 60 degrees in a direction of a longitudinal axis of the handset in order to render the labeling easy to read in each one of a plurality of operating positions of the handset,
   wherein the front panel unit includes at least one further control key for controlling the car radio, the at least one further control key being positioned adjacent to the horizontally positioned holder.

2. The car radio according to claim 1, wherein:
   the first axis of the labeling is rotated 45 degrees in relation to the direction of the longitudinal axis of the handset.

3. The car radio according to claim 1, wherein:
   the control keys include labeled elongated keys oriented perpendicular to the first axis of the labeling.

4. The car radio according to claim 1, wherein:
   a direction of a display on the screen is capable of being changed in order to adjust the screen to one of the plurality of operating positions.

5. The car radio according to claim 4, wherein:
   the handset includes a position sensor for changing the display on the screen.

6. The car radio according to claim 1, wherein:
   the handset includes a remote control unit for the car radio.

7. The car radio according to claim 1, wherein:
   the handset includes at least one soft key for selecting stored radio stations, the at least one soft key being positioned adjacent to the screen.

8. The car radio according to claim 7, wherein the stored radio stations are reproduced on the screen adjacent to the at least one soft key.

\* \* \* \* \*